United States Patent
Suzuki

(10) Patent No.: US 7,535,379 B2
(45) Date of Patent: May 19, 2009

(54) SERVER AND VEHICLE-MOUNTED NAVIGATION APPARATUS, VEHICLE EMPLOYING THE SAME, AND METEOROLOGICAL INFORMATION DISTRIBUTION SYSTEM RELATED TO THE SAME

(75) Inventor: Atsuyuki Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 11/538,284

(22) Filed: Oct. 3, 2006

(65) Prior Publication Data

US 2007/0083328 A1  Apr. 12, 2007

(30) Foreign Application Priority Data

Oct. 5, 2005  (JP) ............... 2005-292931

(51) Int. Cl.
- G08G 1/09 (2006.01)
- G08C 21/00 (2006.01)
- G08G 1/123 (2006.01)

(52) U.S. Cl. .............. 340/905; 340/988; 340/990; 340/991; 340/995.1; 340/995.19; 340/426.19; 340/539.26; 340/539.28

(58) Field of Classification Search ............... None
See application file for complete search history.

(56) References Cited

U.S. PATENT DOCUMENTS

| | | | | |
|---|---|---|---|---|
| 7,176,832 | B2 * | 2/2007 | Bruno et al. ......... | 342/357.06 |
| 2004/0181340 | A1 * | 9/2004 | Smith ............... | 702/3 |
| 2005/0086004 | A1 * | 4/2005 | Smith ............... | 702/3 |
| 2005/0187714 | A1 * | 8/2005 | Brulle-Drews ........ | 702/3 |
| 2005/0197775 | A1 * | 9/2005 | Smith ............... | 702/3 |
| 2005/0240378 | A1 * | 10/2005 | Smith et al. ......... | 702/188 |
| 2006/0015254 | A1 * | 1/2006 | Smith ............... | 702/3 |
| 2007/0094262 | A1 * | 4/2007 | Suzuki et al. ........ | 707/9 |

FOREIGN PATENT DOCUMENTS

JP    2003-066160    3/2003

* cited by examiner

Primary Examiner—Julie Lieu
(74) Attorney, Agent, or Firm—Rankin, Hill & Clark LLP

(57) ABSTRACT

A server specifies a sending range for meteorological information that it has received, for each type of meteorological information. The server also specifies constitution and size of area meteorological data distributing for each area segment. This will enable the server to provide necessary meteorological information more efficiently. Furthermore, a vehicle-mounted navigation apparatus, or a vehicle, selects and specifies different meteorological information for a corresponding area segment based on present position and route, and specifies the constitution and the size of area meteorological data requesting distribution, by the server. It is expected that this can reduce the data size of meteorological information and prevent unnecessary information from being distributed, enabling savings in communication time and communication charges when data is received.

8 Claims, 11 Drawing Sheets

FIG. 4

| AREA A | AREA B | AREA C | |
|---|---|---|---|
| AMEDAS | AMEDAS | AMEDAS | |
| WEATHER FORECAST | AMEDAS FORECAST DATA | TYPHOON DETAIL | ... |
| | WEATHER FORECAST | WEATHER FORECAST | |
| WEATHER WARNINGS AND ADVISORIES | WEATHER WARNINGS AND ADVISORIES | WEATHER WARNINGS AND ADVISORIES | |

FIG. 5

| METEOROLOGICAL INFORMATION TYPE | AREA |
|---|---|
| AMEDAS | METROPOLITAN AREA, KYOTO-OSAKA-KOBE AREA, ... |
| WEATHER FORECAST | NATIONWIDE |
| TYPHOON INFORMATION | KYUSYU, OKINAWA, SHIKOKU |
| ⋮ | ⋮ |

FIG. 6

| MESH CODE | AMEDAS DATA | WEATHER FORECAST | AMEDAS FORECAST DATA | TYPHOON INFORMATION | WEATHER WARNINGS AND ADVISORIES | ... |
|---|---|---|---|---|---|---|
| 5339 | 60 | 30 | 0 | 0 | 10 | ... |
| ... | ... | ... | ... | ... | ... | ... |
| 4830 | 25 | 50 | 20 | 0 | 5 | ... |
| ... | ... | ... | ... | ... | ... | ... |
| 3927 | 0 | 40 | 30 | 20 | 20 | ... |

FIG. 8

| DATA NAME | MESH CODE |
|---|---|
| AMEDAS DATA | 5339, 4830··· |
| WEATHER FORECAST | 5339, ··· |
| WEATHER WARNINGS AND ADVISORIES | 5339, ··· |
| AMEDAS FORECAST DATA | 4830, 3927··· |
| ⋮ | ⋮ |

FIG. 9

| MESH CODE | AMEDAS DATA | WEATHER FORECAST | AMEDAS FORECAST DATA | TYPHOON INFORMATION | WEATHER WARNINGS AND ADVISORIES | ... |
|---|---|---|---|---|---|---|
| 3927 | 0 | 40 | 30 | 20 | 20 | ... |
| 4830 | 25 | 50 | 20 | 5 | 5 | ... |
| 5339 | 60 | 30 | 0 | 0 | 10 | ... |
| ... | ... | ... | ... | ... | ... | ... |

SERVER AND VEHICLE-MOUNTED NAVIGATION APPARATUS, VEHICLE EMPLOYING THE SAME, AND METEOROLOGICAL INFORMATION DISTRIBUTION SYSTEM RELATED TO THE SAME

This application is based on and claims the benefit of priority from Japanese Patent Application No. 2005-292931, filed on 5 Oct. 2005, the content of which is incorporated herein by reference.

BACKGROUND OF THE INVENTION

1. Field of the Invention

The present invention relates to a server that distributes meteorological information to a vehicle and/or a vehicle-mounted navigation apparatus, a vehicle and a vehicle-mounted navigation apparatus that request meteorological information to the server, and a meteorological information distribution system.

2. Related Art

There is a method for distributing meteorological information to navigation apparatuses in which a content provider receives meteorological information obtained from meteorological satellites, the Automated Meteorological Data Acquisition System (AMeDAS), or the like, from organizations, such as the Japan Weather Association, and distributes it to navigation apparatuses as it is. In addition, the invention disclosed in Japanese Unexamined Patent publication No. 2003-66160 is a technique in which emergency information relating to an area is distributed in response to a request from a terminal, i.e., navigation apparatus.

However, when the meteorological data obtained from the meteorological satellites, the AMeDAS, or the like, is distributed to the whole nation as it is, the volume of the data tends to increase because wide-area meteorological data is distributed. As a result, when the data is received by a vehicle or a vehicle-mounted navigation apparatus, a lot of communication time and high communication charges are required for receiving it, making the method inappropriate. Furthermore, weather advisories, warnings, or the like, that are distributed are issued based on criteria which are different from area to area. In general, updates of such weather advisories, warning, or the like based on different area-to-area criteria is infrequent. As a result, weather warnings or the like which are appropriate for that area may not be always issued.

Furthermore, in the method disclosed in the above-described Japanese Unexamined Patent publication No. 2003-66160, although it is possible to display information relating to areas centered on a position selected by a user, the communication link has to be maintained to achieve this. Furthermore, the contents of the information are fixed and cannot be changed from season to season or from area to area. In addition, since a large volume of data, such as AMeDAS data, is also sent from the server, the large size of the data has to be transmitted, which may result in waste of communication time and communication charges when wireless communication is used, as in the case of a vehicle or a vehicle-mounted navigation apparatus.

In principle, meteorological information that is required, or types of weather warning that are frequently issued, generally vary from area to area or from season to season. For example, in the metropolitan area including Tokyo, the public transportation systems are often severely disrupted by even a small amount of snowfall, so that frequently-updated information is generally desired. For this reason, in the Tokyo metropolitan area, it is required that information specific to certain areas or seasons be distributed, such as distributing frequently-updated meteorological data from the AMeDAS with a higher priority.

In addition, the data size may be increased by simply distributing information desired for that area. For example, since the size of the meteorological data from the AMeDAS is usually large, the size of the entire data to be sent is increased when the data from the AMeDAS is distributed with a higher priority, which may cause waste of communication time and communication charges.

SUMMARY OF THE INVENTION

An object of the present invention is to provide a server, a vehicle, a vehicle-mounted navigation apparatus, and a meteorological information distribution system that distribute information suitable to a certain area, season, disaster, or the like to the vehicle-mounted navigation apparatus in order to reduce the data size. That is, they distribute information suitable for the area to save communication time and communication fees by reducing the data size.

In order to solve above-described problems, the present invention provides a server, a vehicle, a vehicle-mounted navigation apparatus, and a meteorological information provision system as follows:

In a first aspect of the invention, a server is provided that is capable of communicating with a vehicle, including: a meteorological information storage device that stores meteorological information; an area segment data storage device that stores area segment data indicating area segments, the area segments being obtained by dividing an area into predetermined units; a distribution area determination device that specifies a range of an area segment for which the meteorological information is to be distributed, based on the meteorological information being a certain type of meteorological information; an area meteorological data generation device that generates area meteorological data related to the meteorological information corresponding to the range specified by the distribution area determination device; a vehicle-related information reception device that receives at least one of positional information and route information of the vehicle; a distribution data selection device that selects the area meteorological data of the area segment corresponding to the information based on the reception by the vehicle-related information reception device; and a distribution device that distributes the area meteorological data selected by the distribution data selection device.

According to the first aspect of the invention, the vehicle is shown as a vehicle 2b or the like that will be described later, for example, and the server is shown as a server 1 or the like that will be described later, for example. The meteorological information storage device is shown as a meteorological information database 22 or the like that will be described later, for example, and stores meteorological information. The area segment data storage device is shown as a map data database 24 or the like that will be described later, for example, and stores area segment data indicating area segments that are obtained by dividing an area into predetermined units. The distribution area determination device is shown as a distribution area determination unit 12 or a table shown in FIG. 5 or the like that will be described later, for example, and specifies a range of the area segment for which the meteorological information is to be distributed based on the meteorological information being a certain type of meteorological information. The area meteorological data generation device is shown as a area meteorological data generation unit 16 or the like that will be described later, for example, and generates area meteorological data related to the meteorological information corresponding to the range specified by the distribution area determination device. The vehicle-related information reception device is shown as the communication unit 20 or the like that will be described later, for example, and receives at least one of positional information and route information of the vehicle. The distribution data selection device is shown as a distribution data selection unit 14 or the like that will be described later, for example, and selects the area meteorological data of the area segment corresponding to the information based on the reception by the vehicle-related information reception device.

By the above-described structure, the server according to the present invention specifies a distribution range of meteorological information received from the meteorological information distribution server for each area segment according to the type thereof and generates area meteorological data beforehand. In response to receiving positional information and/or route information from the vehicle, the distribution data selection device selects area meteorological data associated with the area segment containing the position indicated by the positional information and/or route information of the vehicle and distributes it. By this, since it is possible to specify distribution areas beforehand according to types of meteorological information, unnecessary meteorological information not related to the concerned area is prevented from being distributed. As a result, it is possible to reduce the size of data distributed, and the communication time and communication fees required for the receiving party can be saved.

In a second aspect of the invention, a server according to the first aspect is provided, wherein the area meteorological data generation device generates different area meteorological data for each area segment in terms of at least one of content and volume associated with each area segment.

According to the second aspect of the invention, since the server can specify the constitution and the size of meteorological information to be distributed using the area meteorological data generation device shown as a table shown in FIG. 6 that will be described later, for example, it becomes possible to distribute the meteorological information in a manner more suitable for the area. By this, when the data is distributed in a fixed data size, for example, more efficient distribution of the data is made possible for meteorological information that is expected to be required.

In a third aspect of the invention, a server is provided that is capable of communicating with a vehicle, including: a meteorological information storage device that stores meteorological information; a vehicle-related information reception device that receives meteorological information of an area segment corresponding to at least one of a present position and route information of the vehicle, the meteorological information specified by the vehicle being a certain type of meteorological information; a distribution data selection device that selects meteorological information corresponding to the meteorological information received by the vehicle-related information reception device; and a distribution device that distributes the meteorological information selected by the distribution data selection device.

According to the third aspect of the invention, the vehicle is shown as a vehicle 2b or the like that will be described later, for example, and the server is shown as a server 1 or the like that will be described later, for example. The meteorological information storage device that stores meteorological information is shown as a meteorological information database 22 or the like that will be described later, for example. The vehicle-related information reception device is shown as a communication unit 20 or the like that will be described later, for example, and in addition to based on the meteorological information specified by the vehicle being certain meteorological information, it receives the meteorological information of the area segment, such as the table shown in FIG. 9 that will be described later, for example, according to at least one of the present position of the vehicle and the route information of the vehicle. The distribution data selection device is shown as a distribution data selection unit 14 or the like that will be described later, for example, and selects meteorological information corresponding to the meteorological information received by the vehicle-related information reception device. The distribution device is shown as a communication unit 20 or the like that will be described later, for example, and distributes the meteorological information selected by the distribution data selection device.

By the above-described structure, the server according to the present invention selects meteorological information stored in the meteorological information storage device corresponding to the meteorological information specified by the vehicle for the present position or the route of the vehicle, and sends it to that vehicle. By this, since the server simply has to send meteorological information requested by the vehicle, it is possible to send the information with a smaller data size than that when meteorological information of all types or all areas is sent.

In a fourth aspect of the invention, a vehicle-mounted navigation apparatus is provided for searching for a route corresponding to a destination of a vehicle, displaying map data on a display device, and performing a route navigation, the apparatus including: a position determination device that can determine a present position of the vehicle; a communication device that communicates with a server; a communication control device that sends to the server, via the communication device, at least one of route information of the route and positional information of the vehicle identified by the position determination device; and a display control device that displays on the display device a display symbol corresponding to meteorological information included in the area meteorological data related to a predetermined area segment associated with the information concerning the vehicle received by the communication unit from the server.

According to the fourth aspect of the invention, in the vehicle-mounted navigation apparatus, the position determination device is shown as a GPS reception unit 42 that will be described later, for example, and can determine the present position of the vehicle. The communication device is shown as a communication unit 44 that will be described later, for example, and carries out communication with the server. By this, the vehicle-mounted navigation apparatus searches for a route corresponding to a destination of the vehicle, and provides a route navigation by displaying map data on a display device, such as shown by a display unit 52 that will be described later, for example. Furthermore, the communication control device is shown as a communication control unit 34 that will be described later, for example, and sends to the server via the communication device at least one of positional information and route information on the route of the vehicle identified by the position determination device. The display control device is shown as a display control unit 40 that will be described later, for example, and displays on the display device a display symbol corresponding to meteorological information included in the area meteorological data related to a predetermined area segment associated with the information on the vehicle received from the server by the communication device.

According to the above-described structure, the communication control device sends the positional information and/or route information to server via the communication device, and the communication device receives area meteorological data from the server. The display control device then displays on the display device a display symbol corresponding to meteorological information included in the area meteorological data. Therefore, since it is possible to receive from the server the area meteorological data associated with the area segment corresponding to positional information and/or route information by sending the positional information and/or route information to the server, reception of data other than the specified one can be avoided, which enables saving of the communication fees and communication time.

In a fifth aspect of the invention, a vehicle-mounted navigation apparatus is provided for searching for a route corresponding to a destination of a vehicle, displaying map data on a display device, and performing a route navigation, the apparatus including: position determination device that can determine a present position of the vehicle; a communication device that communicates with a server; an area segment data storage device that stores area segment data indicating area segments, the area segments being obtained by dividing an area into predetermined units; a meteorological information specifying device that specifies meteorological information of an area segment corresponding to information of at least one of route information of the route present position of the vehicle and identified by the position determination device, the meteorological information being a certain type of meteorological information; a communication control device that sends to the server, via the communication device, the meteorological information specified by the meteorological information specifying device; and a display control device that displays on the display device a display symbol corresponding to meteorological information included in area meteorological data received by the communication unit from the server.

According to fifth aspect of the invention, in the vehicle-mounted navigation apparatus, the position determination device is shown as a GPS reception unit 42 that will be described later, for example, and can determine the present position of the vehicle. The communication device is shown as a communication unit 44 that will be described later, for example, and carries out communication with the server. Therefore, the vehicle-mounted navigation apparatus searches for a route corresponding to a destination of the vehicle, displays map data on a display device, and provides a route navigation. Furthermore, the area segment data storage device is shown as a map data database 54 that will be described later, for example, and stores area segment data indicating area segments that are obtained by dividing an area into predetermined units. The meteorological information specifying device is shown as a meteorological information specifying unit 33 that will be described later, for example, and specifies meteorological information corresponding to at least one of a present position of the vehicle and route information on the route identified by the position determination device, in addition to the meteorological information being certain meteorological information. The communication control device is shown as a communication control unit 34 that will be described later, for example, and sends the meteorological information specified by the meteorological information specifying device to the server via the communication device. The display control device is shown as a display control unit 40 that will be described later, for example, and displays on the display device a display symbol corresponding to meteorological information included in the area meteorological data received from the server by the communication device.

According to the above-described structure, the vehicle-mounted navigation apparatus stores the area segment data to the area segment data storage device beforehand. The meteorological information specifying device then selects and specifies meteorological information to be requested to the server in the corresponding area segment based on the present position and/or route information of the vehicle-mounted navigation apparatus. Furthermore, the meteorological information specifying device sends the specified meteorological information to the server, and receives by the communication device area meteorological data distributed from the server that receives the specified meteorological information. The display control device then displays the corresponding display symbol on the display device. By this, since it is possible to request necessary meteorological information to the server beforehand and to receive the requested data, the data size of the meteorological information distributed to the vehicle-mounted navigation apparatus can be reduced. In addition, it is possible to prevent information other than the specified data from being distributed from the server. Furthermore, it is expected that this can help to save communication time and communication fees upon receiving information.

In a sixth aspect of the invention, a vehicle-mounted navigation apparatus according to the fifth aspect is provided, wherein the meteorological information specifying device specifies different meteorological information for each area segment in terms of at least one of content and volume associated with the each area segment.

According to the sixth aspect of the invention, in addition to the advantages of the fifth aspect of the invention, since it is possible to specify the constitution and the size of the meteorological information to be distributed, the meteorological information can be obtained with more suitable constitution for the area. By this, when the data is distributed in a fixed data size, for example, more efficient distribution of the data can be made to the server for a type of meteorological information that is expected to be required by increasing the ratio of that type of meteorological information or the like.

In a seventh aspect of the invention, a vehicle is provided for searching for a route corresponding to a destination of the vehicle, displaying map data on a display device, and performing a route navigation, the vehicle including: a position determination device that can determine a present position of the vehicle; a communication device that communicates with a server; a communication control device that sends to the server, via the communication device, at least one of route information of the route positional information of the vehicle identified by the position determination device; and a display control device that displays on the display device a display symbol corresponding to meteorological information included in the area meteorological data related to a predetermined area segment associated with the information concerning the vehicle received by the communication unit from the server.

According to the seventh aspect of the invention, the position determination device is shown as a GPS reception unit 42 that will be described later, for example, and can determine the present position of the vehicle. The communication device is shown as a communication unit 44 that will be described later, for example, and carries out communication with the server. The vehicle searches for a route corresponding to a destination of the vehicle using the position determination device and the communication device, displays map data on a display device, and provides a route navigation. The communication control device in the vehicle is shown as a communication control unit 34 that will be described later, for example, and sends to the server via the communication device at least one of positional information and route information on the route of the vehicle identified by the position determination device. Furthermore, the display control device is shown as a display control unit 40 that will be described later, for example, and displays on the display device a display symbol corresponding to meteorological information included in the area meteorological data related to a predetermined area segment associated with the information on the vehicle received by the communication device from the server.

According to the above-described structure, since it is possible to receive from the server the area meteorological data associated with the area segment corresponding to positional information and/or route information by sending the positional information and/or route information to the server, reception of data other than the specified one can be avoided, which enables saving of the communication fees and communication time.

In an eighth aspect of the invention, a vehicle is provided for searching for a route corresponding to a destination of the vehicle, displaying map data on a display device, and performing route navigation, the vehicle including: a position determination device that can determine a present position of the vehicle; a communication device that communicates with a server; an area segment data storage device that stores area segment data indicating area segments, the area segments being obtained by dividing an area into predetermined units; a meteorological information specifying device that specifies meteorological information corresponding to at least one of route information of the route and a present position of the vehicle identified by the position determination device, the meteorological information being a certain type of meteorological information; a communication control device that sends to the server via the communication device, the meteorological information specified by the meteorological information specifying device; and a display control device that displays on the display device a display symbol corresponding to meteorological information included in area meteorological data received by the communication unit from the server.

According to the eighth aspect of the invention, the position determination device is shown as a GPS reception unit 42 that will be described later, for example, and can determine the present position of the vehicle. The communication device is shown as a communication unit 44 that will be described later, for example, and carries out communication with the server. The vehicle searches for a route corresponding to a destination of the vehicle using the position determination device and the communication device, displays map data on a display device, and provides a route navigation. The area segment data storage device in the vehicle is shown as a map data database 54 that will be described later, for example, and stores area segment data indicating area segments that are obtained by dividing an area into predetermined units. The meteorological information specifying device is shown as a meteorological information specifying unit 33 that will be described later, for example, and specifies the meteorological information corresponding to information on at least one of a present position of the vehicle and route information on the route identified by the position determination device, in addition to the meteorological information being certain meteorological information. The communication control device is shown as a communication control unit 34 that will be described later, for example, and sends the meteorological information specified by the meteorological information specifying device to the server via the communication device. The display control device is shown as a display control unit 40 that will be described later, for example, and displays on the display device a display symbol corresponding to meteorological information included in the area meteorological data received from the server by the communication device.

According to the above-described structure, since it is possible for the vehicle to request necessary meteorological information to the server beforehand and to receive the requested data, the data size of the meteorological information distributed to the vehicle-mounted navigation apparatus can be reduced. In addition, it is possible to prevent information other than the specified data from being distributed from the server. Furthermore, it is expected that this can help to save communication time and communication fees upon receiving information.

In a ninth aspect of the invention, a vehicle is provided according to the eighth aspect, wherein the meteorological information specifying device specifies different meteorological information for each area segment in terms of at least one of content and volume associated with the each area segment.

According to the ninth aspect of the invention, it is possible to reduce the size of the meteorological information distributed from the server by selecting and specifying necessary meteorological information based on the present position and/or route thereof beforehand. By this, it is possible to prevent unnecessary information from being distributed from the server. Furthermore, it is expected that this can help to save communication time and communication fees upon receiving information.

In a tenth aspect of the invention, a meteorological information distribution system is provided including a server and a vehicle, the server and the vehicle being capable of communicating with each other, the server including: a meteorological information storage device that stores meteorological information; an area segment data storage device that stores area segment data indicating area segments, the area segments being obtained by dividing an area into predetermined units; a distribution area determination device that specifies a range of an area segment for which the meteorological information is to be distributed, based on the meteorological information being a certain type of meteorological information; a area meteorological data generation device that generates area meteorological data related to the meteorological information corresponding to the range specified by the distribution area determination device; a vehicle-related information reception device that receives at least one of positional information and route information on the vehicle; a distribution data selection device that selects the area meteorological data of the area segment corresponding to the information on the vehicle based on the reception by the vehicle-related information reception device; and a distribution device that distributes the area meteorological data selected by the distribution data selection device, and the vehicle including: a position determination device that can determine a present position of the vehicle; a communication device that communicates with a server; a route searching device that searches for a route corresponding to a destination of the vehicle; a communication control device that sends to the server, via the communication device, the information concerning the vehicle; and a display control device that displays on a display device the display symbol corresponding to meteorological information included in the area meteorological data received from the server.

According to the tenth aspect of the invention, the server stores meteorological information in the meteorological information storage device that is shown as a meteorological information database 22 or the like that will be described later, for example. In the server, the distribution area determination device is shown as a distribution area determination unit 12 or a table shown in FIG. 5 or the like that will be described later, and specifies a range of an area segment to which meteorological information is to be distributed based on the meteorological information being a certain type of meteorological information. Furthermore, the area meteorological data generation device is shown as a area meteorological data generation unit 16 or the like that will be described later, for example, and generates area meteorological data related to the meteorological information corresponding to the range specified by the distribution area determination device. Furthermore, the vehicle-related information reception device is shown as the communication unit 20 or the like that will be described later, for example, and receives at least one of positional information and route information on the vehicle. The distribution data selection device is shown as a distribution data selection unit 14 or the like that will be described later, for example, and selects the area meteorological data of the area segment corresponding to the information on the vehicle based on the reception by the vehicle-related information reception device. Furthermore, the distribution device is shown as a communication unit 20 or the like that will be described later, for example, and distributes the area meteorological data selected by the distribution data selection device. On the other hand, in the vehicle, the position determination device is shown as a GPS reception unit 42 that will be described later, for example, and can determine the present position of the vehicle. Furthermore, the communication device is shown as a communication unit 44 that will be described later, for example, and carries out communication with the server. Furthermore, the route searching device is shown as a route searching unit 32 that will be described later, for example, and searches for a route corresponding to a destination of the vehicle. Furthermore, the communication control device is shown as a communication control unit 34 that will be described later, for example, and sends the information on the vehicle to the server via the communication device. Furthermore, the display control device is shown as a display control unit that will be described later, for example, and displays on a display device a display symbol corresponding to meteorological information included in the area meteorological data received from the server.

According to the above-described structure, the server specifies a distribution range of meteorological information for each area segment according to the type thereof and generates area meteorological data. In response to receiving positional information and/or route information from the vehicle, the distribution data selection device selects area meteorological data associated with the area segment containing the position indicated by the positional information and/or route information of the vehicle and distributes it. In response to receiving the positional information and/or route information from the vehicle, the area meteorological data to be distributed is selected and sent. The vehicle can provide a system in which the area meteorological data is received and a display symbol corresponding to meteorological information included in the area meteorological data is displayed on the display device. By this, since it is possible to specify distribution areas beforehand according to types of meteorological information, unnecessary meteorological information not related to the concerned area is prevented from being distributed. In addition, it is possible for the vehicle to reduce the size of data distributed, and the communication time and communication fees required for the receiving party can be saved.

In an eleventh aspect of the invention, a meteorological information distribution system is provided, including a server and a vehicle, the server and the vehicle being capable of communicating with each other, the server comprising: a meteorological information storage device that stores meteorological information; a vehicle-related information reception device that receives meteorological information of an area segment corresponding to information of at least one of present position and route information of the vehicle, the meteorological information specified by the vehicle being a certain type of meteorological information; a distribution data selection device that selects meteorological information received by the vehicle-related information reception device; and a distribution device that distributes the meteorological information selected by the distribution data selection device; the vehicle including: a position determination device that can determine a present position of the vehicle; a communication device that communicates with a server; a route searching device that searches for a route corresponding to a destination of the vehicle; an area segment data storage device that stores area segment data indicating area segments, the area segments being obtained by dividing an area into predetermined units; a meteorological information specifying device that specifies meteorological information corresponding to at least one of route information on the route and present position of the vehicle identified by the position determination device and based on the meteorological information being a certain type of meteorological information; a communication control device that sends to the server via the communication device, the meteorological information specified by the meteorological information specifying device; and a display control device that displays on the display device on a display device a display symbol corresponding to meteorological information included in area meteorological data received by the communication unit from the server.

According to the eleventh aspect of the invention, the server stores meteorological information in the meteorological information storage device that is shown as a meteorological information database 22 or the like that will be described later, for example. In the server, the vehicle-related information reception device is shown as a communication unit 20 or the like that will be described later, for example, and in addition to based on the meteorological information specified by the vehicle being certain meteorological information, it receives the meteorological information of the area segment, such as the table shown in FIG. 9 that will be described later, for example, according to at least one of the present position of the vehicle and the route information of the vehicle. The distribution data selection device is shown as a distribution data selection unit 14 or the like that will be described later, for example, and selects meteorological information received by the vehicle-related information reception device. Furthermore, the distribution device is shown as a communication unit 20 or the like that will be described later, for example, and distributes the meteorological information selected by the distribution data selection device. Furthermore, in the vehicle, the position determination device is shown as a GPS reception unit 42 that will be described later, for example, and can determine the present position of the vehicle. Furthermore, the communication device is shown as a communication unit 44 that will be described later, for example, and carries out communication with the server. Furthermore, the route searching device is shown as a route searching unit 32 that will be described later, for example, and searches for a route corresponding to a destination of the vehicle. Furthermore, the area segment data storage device is shown as a map data database 54 that will be described later, for example, and stores area segment data indicating area segments that are obtained by dividing an area into predetermined units. The meteorological information specifying device is shown as a meteorological information specifying unit 33 that will be described later, for example, and specifies the meteorological information corresponding to information on at least one of a present position of the vehicle and route information on the route identified by the position determination device, in addition to the meteorological information being certain meteorological information. Furthermore, the communication control device is shown as a communication control unit 34 that will be described later, for example, and sends the meteorological information specified by the meteorological information specifying device to the server via the communication device. Furthermore, the display control device is shown as a display control unit that will be described later, for example, and displays on a display device a display symbol corresponding to meteorological information included in the area meteorological data received from the server by the communication device.

According to the above-described structure, the vehicle stores the area segment data to the area segment data storage device beforehand. The meteorological information specifying device in the vehicle then selects and specifies meteorological information to be requested to the server in the corresponding area segment based on the present position and/or route information of the vehicle. Furthermore, the communication control device in the vehicle sends the specified meteorological information to the server via the communication device. Furthermore, the server receives from the vehicle the meteorological information specified by the vehicle and sends it to the vehicle. The vehicle receives area meteorological data from the server and displays on display device a symbol corresponding to meteorological information in the area meteorological data. By this, it is possible to send data to the vehicle by changing the constitution and the data size of the data to be distributed for each area. It is possible to reduce the size of data to be distributed compared to cases in which nationwide meteorological information is sent, which enables to save communication time and communication fees upon receiving such data. By this, since the server simply has to send meteorological information requested by the vehicle and the vehicle can limit the data to a certain degree, it is possible to send the information with a smaller data size than that when meteorological information of all types or all areas is sent. Furthermore, it is expected that this can help to save communication time and communication fees upon sending and receiving information.

The present invention as described above provides a server and a vehicle-mounted navigation apparatus, a vehicle employing the same, and a meteorological information distribution system related to the same that distribute information suitable for a certain area, season, disaster, or the like to the vehicle-mounted navigation apparatus in order to reduce the data size.

BRIEF DESCRIPTION OF THE DRAWINGS

FIG. 4 is a schematic diagram illustrating an example of selections of area meteorological data of the server according to an example of a preferred embodiment of the present invention;

FIG. 5 is a schematic diagram illustrating an example of selections of meteorological information of the server according to an example of a preferred embodiment of the present invention;

FIG. 6 is a schematic diagram illustrating an example of selections of meteorological information of the server according to an example of a preferred embodiment of the present invention;

FIG. 8 is a schematic diagram illustrating an example of selections of meteorological information of the vehicle-mounted navigation apparatus or the vehicle according to an example of a preferred embodiment of the present invention;

FIG. 9 is a schematic diagram illustrating an example of selections of meteorological information of the vehicle-mounted navigation apparatus or the vehicle according to an example of a preferred embodiment of the present invention;

DETAILED DESCRIPTION OF THE INVENTION

Hereinafter, preferred embodiments of the present invention will be described with reference to the drawings.

Figure 1:
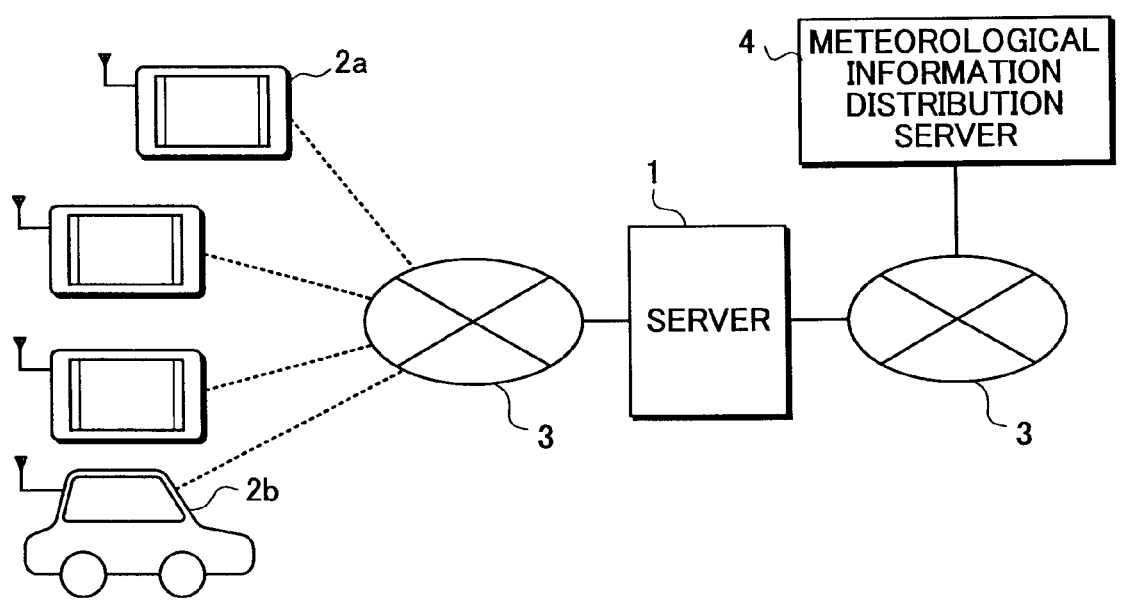
FIG. 1 is a block diagram illustrating a schematic structure of a system including a server, a vehicle-mounted navigation apparatus, and a vehicle according to an example of a preferred embodiment of the present invention.

FIG. 1 is a block diagram illustrating a schematic structure of a meteorological information distribution system which is one embodiment of the present invention. As shown in FIG. 1, the meteorological information distribution system of this embodiment may include a vehicle-mounted navigation apparatus 2a, a vehicle 2b, a server 1, and a meteorological information distribution server 4 which are connected to each other via a communication rink network 3. In this system, the server 1 may receive meteorological information from the meteorological information distribution server 4 via the communication rink network 3, process the meteorological information in order to send information specific to the area in which the position or the route of the vehicle-mounted navigation apparatus 2a or the vehicle 2b is contained, and distribute such information to the vehicle-mounted navigation apparatus 2a or the vehicle 2b.

As used here, the term "meteorological information" may refer to information regarding meteorology, including various types of information regarding weather, such as weather forecasts, the AMeDAS data, various weather advisories, warnings, or the like. It may include, for example, the AMeDAS data, including wind velocities, rainfall, snowfall, typhoon details, the AMeDAS forecast data, ultraviolet ray intensity information, temperature information, pollen dispersal amount information, heat stroke warning information, information on volcanoes, information on tsunamis or earthquakes provided by the Japan Weather Association, and the types of information are not limited to those described above. Furthermore, the meteorological information received by the server 1 is not limited to a single type of information, and multiple types of information may be received.

The meteorological information distribution server 4 may be a server which distributes principally information regarding weather or meteorology, including meteorological information, such as weather forecast or the AMeDAS data, information on earthquakes, tsunamis, various weather advisories, warnings, or the like, provided by the Japan Weather Association. The number of meteorological information distribution servers 4 is not limited to one, and multiple meteorological information distribution servers 4 may be present. Furthermore, the meteorological information distribution server 4 may distribute, in addition to the information regarding to weather or meteorology, traffic information, such as information on congestion or accidents, or information on the current position of the vehicle or the destination area of the vehicle.

Figure 2:
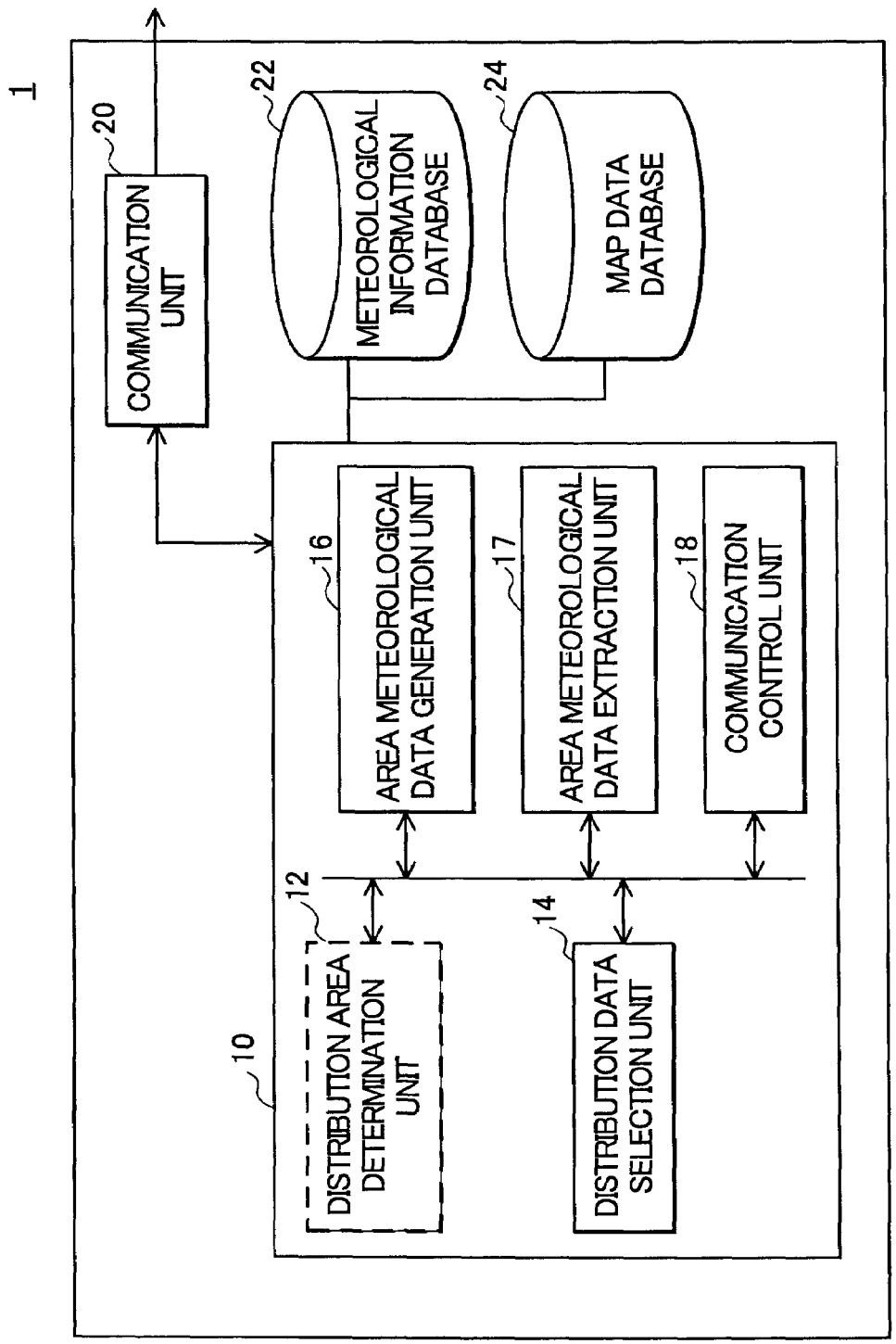
FIG. 2 is a block diagram illustrating a schematic structure of the server according to an example of a preferred embodiment of the present invention.

In response to receiving the meteorological information distributed from the meteorological information distribution server 4, the server 1 may generate area meteorological data for each area segment in order to distribute the meteorological information to the vehicle-mounted navigation apparatus 2a or the vehicle 2b. The server 1 may then receive the positional information and/or the route information from the vehicle-mounted navigation apparatus 2a or the vehicle 2b, determine the area segment for the position or the route of the vehicle-mounted navigation apparatus 2a or the vehicle 2b. The server 1 may select appropriate area meteorological data, and send it to the vehicle-mounted navigation apparatus 2a or the vehicle 2b. The server 1 may include at least a control unit 10, a communication unit 20, a meteorological information database 22, and a map data database 24, as shown in FIG. 2. In addition to obtaining through reception of distributed data from the meteorological information distribution server 4, the server 1 may include a reader of recording media, such as CD-ROMs or DVD-ROMs and obtain the meteorological information through reading from a recording medium.

Figure 3:
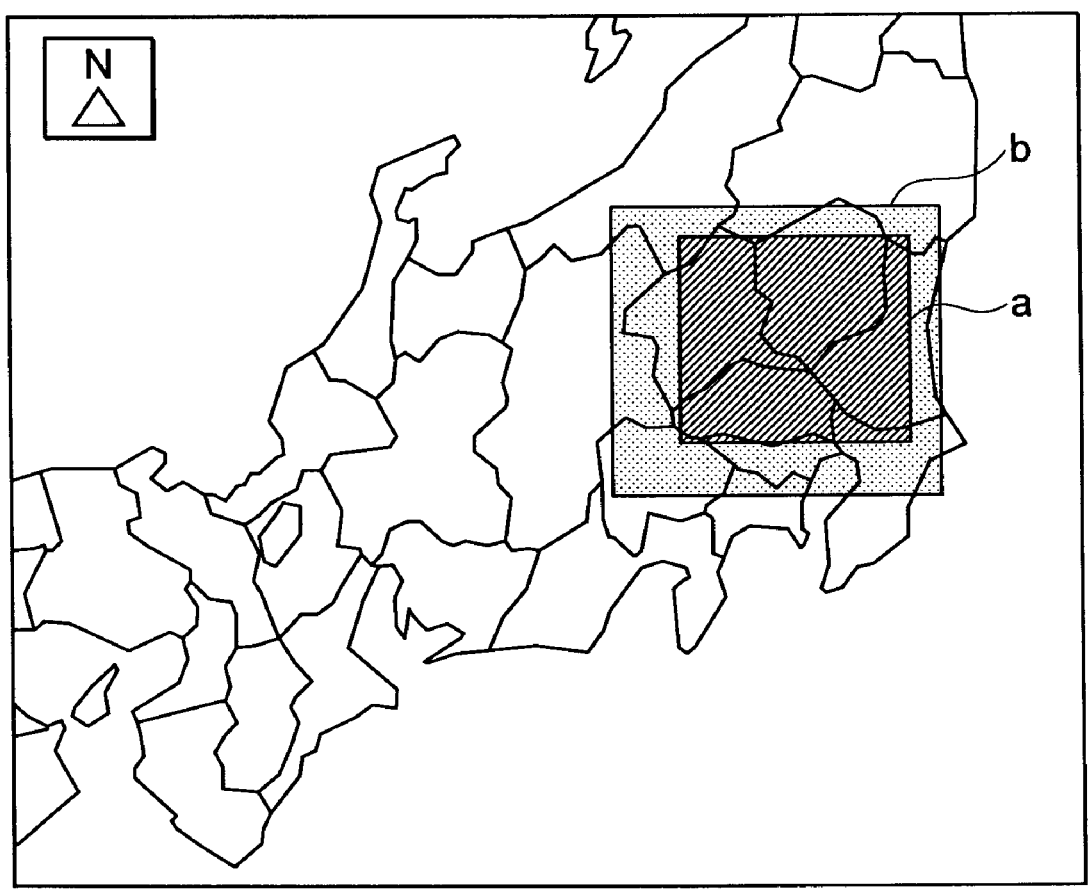
FIG. 3 is a schematic diagram illustrating an example of selections of area meteorological data of the server according to an example of a preferred embodiment of the present invention.

As used herein, the term "area meteorological data" refers to a collection of meteorological information to be distributed to a certain area segment. First, an area meteorological data generation unit 16 may set an area segment to which data is to be distributed according to type of meteorological information received by the server 1. For example, the AMeDAS data may be set to be distributed to a range A and weather forecast data may be set to be distributed to a range B. Furthermore, as shown in FIG. 3, when the range "a" and a range "b" overlap, the area meteorological data generation unit 16 may further determine which information should be distributed with higher priority. For example, as shown in FIG. 4, three types of data, namely, the AMeDAS data, weather forecast data, and weather warnings and advisory data, may be sent to Area A, among which the largest portion is allocated to the AMeDAS data. Furthermore, four types of data, namely, the AMeDAS data, the AMeDAS forecast data, weather forecast data, and weather warnings and advisories data, may be sent to Area B, among which relatively large portions are allocated to the AMeDAS data and the AMeDAS forecast data. Four types of data, namely, the AMeDAS data, typhoon detail data, weather forecast data, and weather warnings and advisories data, may be sent to Area C. As described above, area meteorological data may be composed according to the characteristic nature of an area, such as being frequently hit by typhoons or having heavy snowfalls. Furthermore, if the same size of data is distributed nationwide, the constitution ratio among the data types is varied for each area segment.

The meteorological information database 22 is a database in which the meteorological information received from the meteorological information distribution server 4 is stored. The meteorological information database 22 also stores a relating table which will be described later (FIG. 6). Furthermore, the map data database 24 is a database for storing area segment data relating to area segments obtained by dividing an area into predetermined area segments, as well as map data. The area segments may be obtained by dividing according to a certain unit, or the standardized regional mesh may be used which is obtained by dividing the area by longitudes and latitudes, for example. Furthermore, any mesh may be selected to be used, and the examples may include the first order grid mesh in which the territory of Japan is divided per 1° longitude and 40° latitude, the so-called second order grid mesh in which one grid of the first order grid mesh is divided equally into eight in the directions of longitude and latitude, and the third order grid mesh (i.e., so-called 1 Km mesh, standardized regional mesh) in which one grid of the second order grid mesh is further divided equally into ten in the directions of longitude and latitude. It is to be noted that each of these databases may be composed of a computer readable and writable recording medium, such as non-volatile memory, e.g., a hard disk device, a magneto-optical disk device, a flash memory, or volatile memory, such as, random access memory (RAM), or a combination thereof. Furthermore, these databases may not be necessarily located inside the server 1, and the databases may be provided independently or a dedicated device may be provided.

The standardized regional mesh, also known as the mesh chart of longitude and latitude, is a scheme to partition the territory of Japan into a mesh with lines of longitude lines and latitude spaced apart at equal distances, and includes the first order, second order, and third order regional meshes to which codes according to the longitude and latitude are assigned. The scheme is used as positional information of the digital national land information. In general, the third order grid mesh (i.e., each grid being a square having one side of about one kilometer) is called the standard regional mesh.

The communication unit 20 communicates with the meteorological information server, the vehicle-mounted navigation apparatus 2a, and the vehicle 2b via the communication rink network 3. The communication unit 20 may include an interface that is capable of connecting to a network, for example, an area network (LAN).

The control unit 10 may control all operations of the server 1, as well as performing communication with the meteorological information server, the vehicle-mounted navigation apparatus 2a, or the vehicle 2b, via the communication unit 20. The control unit 10 may also perform operations according to various types of information it receives, and send data in response to a request from the vehicle-mounted navigation apparatus 2a or the vehicle 2b. The control unit 10 includes a distribution area determination unit 12, a distribution data selection unit 14, the area meteorological data generation unit 16, and a communication control unit 18 which are connected each other via a bus. Furthermore, the control unit 10 may be a computer system including a memory and a central processing unit (CPU) in which programs that implement each of the above-described functions are loaded into the memory for execution. Alternatively, the control unit 10 may be implemented by dedicated hardware. It is to be noted that the distribution area determination unit 12 and the area meteorological data generation unit 16 may be omitted when the vehicle-mounted navigation apparatus 2a or the vehicle 2b specify area meteorological data to be requested.

The distribution area determination unit 12 in the control unit 10 may determine which type of meteorological information received from the meteorological information distribution server is to be distributed to which area. For example, as shown in the table of FIG. 5, meteorological information and distribution areas may be associated with each other and distribution areas may be determined based on this table. For example, it may be determined that the AMeDAS data is distributed to Tokyo and Osaka Prefecture and the weather forecast data is distributed nationwide. It is to be noted that although actual names of areas, such as Tokyo or Osaka Prefecture, are used to specify areas in the table shown in FIG. 5, the assignment may be made using mesh codes. Any of the first order, the second order, and the third order mesh codes may be used, and different codes may be used for different areas. In addition to specifying by prefecture, municipalities may be used, such as dividing Tokyo into 23 wards and non-central areas.

As used herein, the term "mesh codes" are numerical codes assigned to identify each grid of the regional meshes in the standardized regional mesh scheme. A number representing a single grid of the first order regional mesh is a four-digit number composed of a two-digit number that is the number obtained by multiplying the southernmost latitude of the grid by 1.5 and a two-digit number which is obtained by subtracting 100 from the westernmost longitude appended after the first two-digit number. Furthermore, for a number representing a single grid of the second order grid mesh in which each regional mesh obtained by dividing a single grid of the first order regional mesh equally into eight in the directions of the longitude and the latitude, a two-digit number is obtained by assigning numbers from 0 to 7 from the south in the direction of the longitude and from the west in the direction of latitude, and combining the numbers of the longitude and the latitude direction in this order. For a number representing a single grid of the third order grid mesh in which each regional mesh obtained by dividing a single grid of the second order regional mesh equally into ten in the directions of the longitude and the latitude, a two-digit number is obtained by assigning numbers from 0 to 9 from the south in the direction of the longitude and from the west in the direction of latitude, and combining the numbers of the longitude and the latitude direction in this order.

The area meteorological data generation unit 16 in the control unit 10 may read the area segments stored in the map data database 24, a distribution range for each type of the meteorological information determined by the distribution area determination unit 12 (FIG. 5), and a relating table (FIG. 6), and generate area meteorological data to be distributed to each area segment. The relating table is a table that relates area segments to types of meteorological information and describes constitution percentages of each type of meteorological information. For example, the entry of Mesh Code 5339 indicates that meteorological information consisting of 60% of the AMeDAS data, 30% of weather forecast data, and 10% of weather warnings and advisories are distributed without distributing AMeDAS forecasts or typhoon information. This is set for each segment. It is to be noted that this constitution table may be varied seasonally or monthly; alternatively, a standard constitution may be set, and different constitutions may be used for certain areas and the standard constitution may be used for remaining areas. Furthermore, although area segments are assigned using the mesh codes in the table shown in FIG. 6, the actual names of prefectures, such as Tokyo or Okinawa Prefecture, names of regions, such as the Kanto region, or names of municipalities may be used.

The distribution data selection unit 14 in the control unit 10 may receive the positional information and/or route information of the vehicle-mounted navigation apparatus 2a or the vehicle 2b received by the communication unit 20, and select area meteorological data to be sent to the vehicle-mounted navigation apparatus 2a or the vehicle 2b. More specifically, an area segment corresponding to the location indicated by the positional information and/or route information is obtained from the area segment data database. Area meteorological data that is associated with that area segment is then selected. When the vehicle-mounted navigation apparatus 2a or the vehicle 2b specifies area meteorological data to be requested, a type of meteorological information and constituent information specified by the vehicle-mounted navigation apparatus 2a or the vehicle 2b are also received in addition to the positional information and/or route information of the vehicle-mounted navigation apparatus 2a or the vehicle 2b. An area segment corresponding to the location indicated by the positional information and/or route information is obtained from the area segment data database, and then various types of meteorological information stored in the meteorological information database 22 are selected according to the specified constituent information. It is to be noted that only types of meteorological information may be specified without defining the constituent information.

An area meteorological data extraction unit 17 in the control unit 10 may read the area meteorological data or meteorological information selected by the distribution data selection unit 14 from the meteorological information database 22, and may pass it to the communication control unit 18 for transmitting to the vehicle-mounted navigation apparatus 2a and the vehicle 2.

The communication control unit 18 in the control unit 10 may receive information from the meteorological information distribution server 4, the vehicle-mounted navigation apparatus 2a, or the vehicle 2b, and may pass the received information to appropriate units, such as the meteorological information database 22, and the distribution data selection unit 14. The communication control unit 18 may also control transmission via the communication unit 20 of the data processed by various components in the control unit 10.

Figure 7:
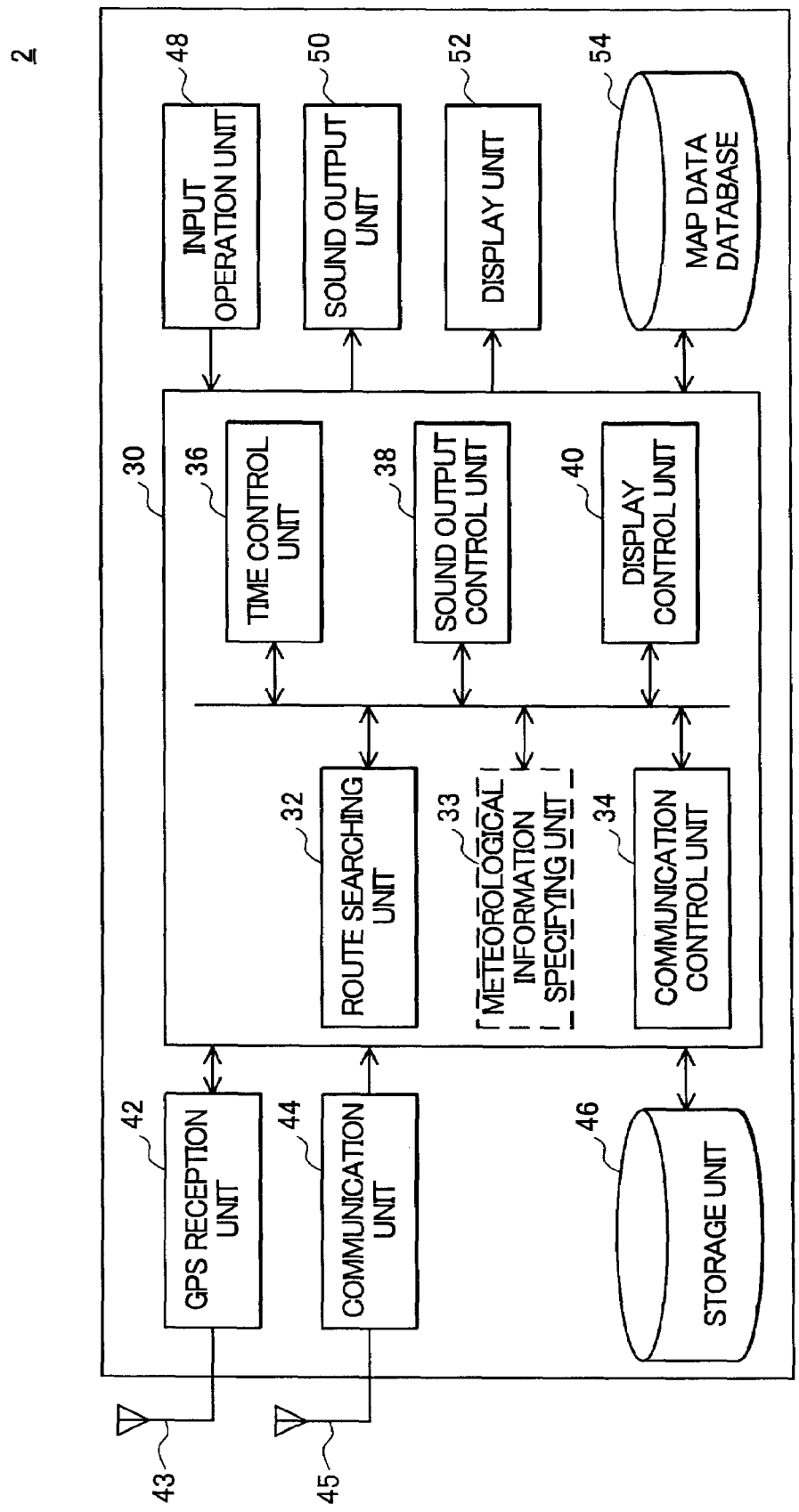
FIG. 7 is a block diagram illustrating a schematic structure of the vehicle-mounted navigation apparatus or the vehicle according to an example of a preferred embodiment of the present invention.

The vehicle-mounted navigation apparatus 2a or the vehicle 2b may include at least a Global Positioning System (GPS) reception unit 42, a GPS antenna 43, a communication unit 44, a communication antenna 45, a control unit 30, a storage unit 46, an input operation unit 48, a sound output unit 50, a display unit 52, and a map data database 54, as shown in FIG. 7. It is to be noted that the structure of the vehicle 2b may be similar to that of the vehicle-mounted navigation apparatus 2a.

The communication unit 44 in the vehicle-mounted navigation apparatus 2a or the vehicle 2b may be a communication unit that communicates to the server 1 through the communication rink network 3 according to commands from the control unit 30, and the communication may be wireless or wired. A mobile terminal may be connected and the communication unit 44 may be embodied by the mobile terminal.

The control unit 30 in the vehicle-mounted navigation apparatus 2a or the vehicle 2b may control the operations of the vehicle-mounted navigation apparatus 2a or the vehicle 2b, and may include at least a route searching unit 32, a meteorological information specifying unit 33, a communication control unit 34, a time control unit 36, a sound output control unit 38, and a display control unit 40. The control unit 30 may identify meteorological information to be requested from the server 1 based on the positional information and/or route information of the vehicle received by the GPS reception unit 42, and may send the identified meteorological information to the server 1. Furthermore, the control unit 30 may be a computer system including a memory and a central processing unit (CPU) in which programs that implement each of the above-described functions are loaded into the memory for execution. Alternatively, the control unit 10 may be implemented by dedicated hardware.

The route searching unit 32 may read from the map data database 54 the map data corresponding to a destination input by the user by means of the input operation unit 48, and may determine the route to be navigated. Upon receiving an input from the user, the map data may be displayed on the display unit 52 by means of the display control unit 40 to assist the user to select the route.

The meteorological information specifying unit 33 may select and specify meteorological information required for the position and/or route of the vehicle according to positional information of the vehicle received by the GPS reception unit 42 and/or the route information of the vehicle determined by the route searching unit 32. This may be done by, for example, first reading the positional information and/or route information of the vehicle, the area segment data, and the tables shown in FIGS. 8 and 9, then finding the area segment associated with the positional information from the map data database 54 based on these, and selecting meteorological information that has been associated with the identified area segment. For example, the type of data to be requested for a certain area segment is determined using the table shown in FIG. 8. The table shown in FIG. 8 contains each type of meteorological information and the associated mesh code indicating an area segment in which the area meteorological data is to be received from the server 1. This table indicates that the AMeDAS data is requested from the server 1 for the area segments corresponding to Mesh Codes 5339 and 4830. Other types of data, such as weather forecast data, weather warnings and advisories data, are similarly associated with mesh codes in which such information is requested from the server 1. This means that the AMeDAS data, the weather forecast data, and the weather warnings and advisories data are to be requested from the server 1 when the location indicated by the positional information is an area segment having mesh code 5339. Next, the ratio among each type of meteorological information within a certain size of data is specified. For example, the relating table shown in FIG. 9, the component ratio is specified by giving numbers to the entries 80 located on the intersections of the mesh codes and the meteorological information types. For the area segment corresponding to Mesh Code 5339, the ratio among data types in a predetermined size of data that is requested to the server 1 is 60%:30%:10% for the AMeDAS data, the weather forecast data, and the weather warnings and advisories data. Although the ratio is represented by relative values with respect to the total data size in the table shown in the FIG. 9, actual data sizes, such as byte counts, may be used to present the ratio. Then, the information defining the types of meteorological information and the component ratio among them in the data to be requested to the server 1 (hereinafter, referred to as "constituent information") may be sent to the server 1. It is to be noted that the meteorological information specifying unit 33 may be omitted if the server 1 determines types of meteorological information required by the vehicle-mounted navigation apparatus 2a or the vehicle 2b.

For providing a route navigation via voice in addition to the visual display through the display unit 52, the sound output control unit 38 may read audio data for the route navigation from the storage unit 46 and control an output of the voice from the sound output unit 50. Furthermore, sounds may be output for providing other types of information sent from the server 1, such as weather warnings and advisories or traffic information, other than route navigations.

The display control unit 40 may read map data from the map data database 54, and display the map on the display unit 52 during route navigation, upon determination of a route, or upon receiving a request that is entered through the input operation unit 48. The display control unit 40 may also read symbol data corresponding to the meteorological information or the warning information from the storage unit 46, and display such symbols.

The control unit 30 may be connected to the storage unit 46 and the map data database 54, and the storage unit 46 may store area meteorological data received from the server 1, temporary data used by the control unit 30, route information, various settings entered via inputs from the input operation unit 48 or the like, symbol data corresponding to the meteorological information or the warning information, and audio data. The map data database 54 may store map data used for route navigations or the like and area segment data, the area segments are obtained by dividing an area in a predetermined segment. The control unit 30 may obtain various types of data by reading data stored in the storage unit 46 or the map data database 54.

The control unit 30 may also be connected to the input operation unit 48, the sound output unit 50, and/or the display unit 52. The input operation unit 48 may include a keypad, buttons, a pointing device, or the like through which the user can operate the vehicle-mounted navigation apparatus 2a or the vehicle 2b. For providing route navigation, not only with the display on the display unit 52, the sound output unit 50 may output voice guidance for the route, or the like, for assisting the display. The display unit 52 may include a device for displaying text or a map, such as a liquid crystal display; it may be integrated into the main body of the vehicle-mounted navigation apparatus 2a or the vehicle 2b, or a separate display device may be connected to provide the display unit 52.

Figure 10:
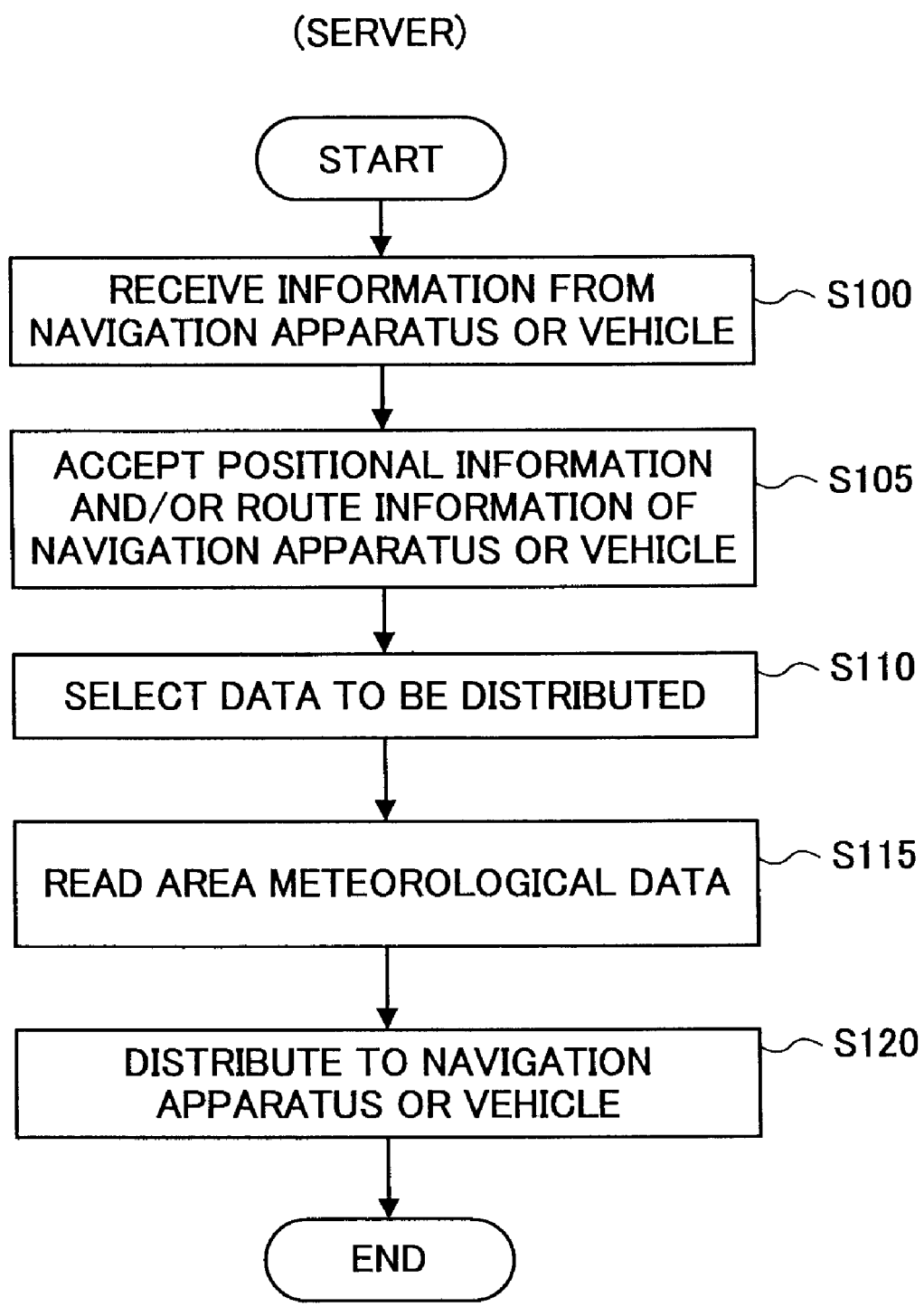
FIG. 10 is a flowchart showing a flow of processes in the server according to an example of a preferred embodiment of the present invention.

Next, operations of and process procedures performed by the vehicle-mounted navigation apparatus 2a or the vehicle 2b and the server 1 which are embodiments of the present invention will be explained with reference to the drawings. FIG. 10 is a flowchart showing operations of and process procedures performed by the server 1 which is one embodiment of the present invention.

First, the control unit 10 in the server 1 may receive the positional information and/or the route information or the constituent information of the meteorological information from the vehicle-mounted navigation apparatus 2a or the vehicle 2b via the communication unit 20 (step S100). The control unit 10 in the server 1 then may accept the positional information and/or the route information of the vehicle-mounted navigation apparatus 2a or the vehicle 2b or the constituent information of the meteorological information which have been received simultaneously (step S105). As for acceptance of the positional information and/or the route information of the vehicle-mounted navigation apparatus 2a or the vehicle 2b, or the constituent information of the meteorological information, rather than receiving them simultaneously, after the control unit 10 in the server 1 accepts a signal of a distribution request from the vehicle-mounted navigation apparatus 2a or the vehicle 2b, the vehicle-mounted navigation apparatus 2a or the vehicle 2b may send the positional information and/or the route information of the vehicle-mounted navigation apparatus 2a or the vehicle 2b or the constituent information of the meteorological information. It is to be noted that "the constituent information of the meteorological information" is information received when the vehicle-mounted navigation apparatus 2a or the vehicle 2b specifies types of meteorological information, the component ratio between them, and the like. When the types of meteorological information, the component ratio between, or the like are not specified, such data may not be received.

After the positional information and/or the route information or the constituent information of the meteorological information is obtained, the distribution data selection unit 14 in the server 1 then may obtain an area segment corresponding to the location indicated by the positional information and/or the route information from the area segment data database. The distribution data selection unit 14 may then select area meteorological data associated with that area segment using the relating table (FIG. 6) (step S110). Furthermore, when the constituent information of the meteorological information has been received in step S100, the distribution data selection unit 14 may determine an area segment indicated by the constituent information of the meteorological information and select meteorological information according to the received constituent information of the meteorological information in step S110. The area meteorological data extraction unit 17 may then read corresponding area meteorological data from the meteorological information database 22 (step S115). The communication control unit 18 may then distribute the area meteorological data to the vehicle-mounted navigation apparatus 2a or the vehicle 2b via the communication unit 20 (step S120).

Figure 11:
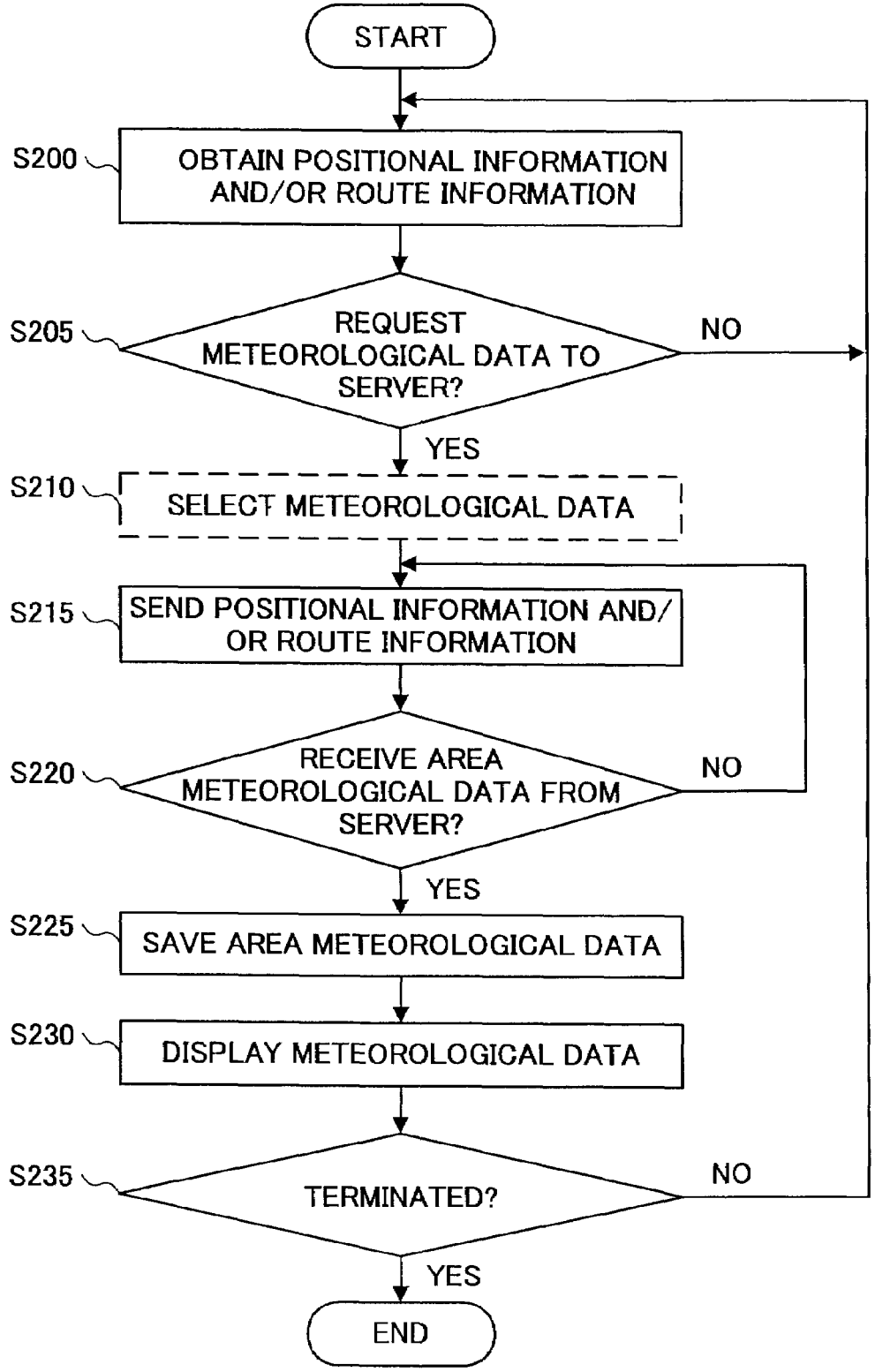
FIG. 11 is a flowchart showing a flow of processes in the server according to an example of a preferred embodiment of the present invention.

FIG. 11 is a flowchart showing operations of and process procedures performed by the vehicle-mounted navigation apparatus 2a or the vehicle 2b which is one embodiment of the present invention.

First, the control unit 30 in the vehicle-mounted navigation apparatus 2a or the vehicle 2b may obtain the present position of the vehicle from the GPS reception unit 42. Furthermore, when the user has set a destination, the control unit 30 in the vehicle-mounted navigation apparatus 2a or the vehicle 2b may obtain route information to the destination that has been set using the route searching unit 32 (step S200). Next, the control unit 30 may determine whether or not a request for meteorological information from the server 1 should be made (step S205). This determination may be made by connecting to the server 1 when the route information is obtained from the route searching unit 32 in step S200, or by making a connection request to the server 1 by a time control unit 36 at a prescribed time interval. This prescribed time interval may be a preset time, or it may be set by the user via the input operation unit 48. When the control unit 30 determines that no request for meteorological information is to be made to the server 1 in this determination, the flow returns to step S200. Otherwise, when the control unit 30 determines that a request for meteorological information is to be made to the server 1, the flow proceeds to the next step.

Next, the meteorological information specifying unit 33 in the control unit 30 may determine a corresponding area segment from the area segments stored in the map data database 54 based on the route information which has been determined by a route searching unit of the vehicle and received by the GPS reception unit 42. The meteorological information specifying unit 33 may then select and specify meteorological information required for the position and/or route of the vehicle based on that area segment (step S210) This may be done by using a table that relates various types of meteorological information to mesh codes indicating the area segments, as the one shown in FIG. 8. In addition, the constitution ratio and/or the data size of the meteorological information to be requested to the server 1 may be specified, as shown in FIG. 9. It is to be noted that step S210 may be omitted when the server 1 determines the meteorological information required for the vehicle-mounted navigation apparatus 2a or the vehicle 2b. In this case, only the positional information and/or the route information has to be sent to the server 1.

The control unit 30 may send to the server 1 via the communication unit 44 the constituent information of the meteorological information to be requested when the processing of step S210 is carried out; alternatively, the control unit 30 may send to the server 1, via the communication unit 44, the positional information and/or route information that has been obtained in step S200 if step S210 is omitted (step S215) Then, the meteorological information that has been distributed from the server 1 (hereinafter, referred to as "area meteorological data") is received (step S220). When the information cannot be received, the flow returns to step S215 in which the meteorological information is requested to the server 1 again. This may be done by requesting the meteorological information by the time control unit 36 at a prescribed time interval, or the step may be terminated after a predetermined number of requests are made but reception of the information fails.

In response to receiving the area meteorological data from the server 1, the control unit 30 may store the received area meteorological data in the storage unit 46 (step S225). The control unit 30 may then display a corresponding area segment associated with the meteorological information on the display unit 52 based on the present position determined by the GPS reception unit 42 and the area segment (step S230). The display of the meteorological information may be provided as symbols indicating the weather, or text may be displayed for weather warnings and advisories. Alternatively, the output may be provided by means of sounds via a sound output device. Furthermore, weather symbols, warnings, or the like, may be displayed superimposing the map data displayed on the display unit 52 by the display control unit 40. The displayed symbols are not limited to weather symbols. The outputs by means of sounds are not limited for weather warnings and advisories, and sound outputs may be employed for route navigations, transportation guides, area information, music, or radio broadcasting.

The control unit 30 may determine whether or not operation of the vehicle-mounted navigation apparatus 2a or the vehicle 2b has terminated (step S235). This determination is made by, for example, a turn-off of the power switch of the vehicle-mounted navigation apparatus 2a, or a turn-off or the ignition switch of the vehicle 2b. Alternatively, completion of a route navigation due to the arrival at the destination may trigger the termination. When no termination is determined, the flow returns to step S200.

As described above, since the server 1 can specify regions to send meteorological information it has received for each type of the meteorological information beforehand, transmission of unnecessary information is eliminated and the size of the data distributed can be reduced. In addition, this enables provision of meteorological information suitable to an area. Furthermore, since it is also possible to specify the constitution ratio of the data to be sent, necessary meteorological information can be provided more efficiently.

Furthermore, it is possible to reduce the size of the meteorological information distributed from the server 1 by selecting and specifying necessary meteorological information at the vehicle-mounted navigation apparatus 2a or the vehicle 2b based on the present position and/or route thereof beforehand since this can prevent unnecessary information from being distributed. It is expected that this can help to save communication time and communication charges upon receiving information.

While embodiments of the invention have been described, these are illustrated merely as specific examples and do not specifically limit the invention. Furthermore, the effects achieved by the embodiments of the present invention described above are merely the most preferred effects provided by the present invention, and the effects of the present invention are not limited to those described with regard to the embodiments of the present invention. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A server that is capable of communicating with a vehicle, the server comprising:
a meteorological information storage device that stores meteorological information;
an area segment data storage device that stores area segment data indicating area segments, the area segments being obtained by dividing an area into predetermined units;
a distribution area determination device that specifies a range of the area segment for which the meteorological information is to be distributed, based on the meteorological information being a certain type of meteorological information;
an area meteorological data generation device that generates area meteorological data related to the meteorological information corresponding to the range specified by the distribution area determination device;
a vehicle-related information reception device that receives at least one of positional information and route information of the vehicle;
a distribution data selection device that selects the area meteorological data of the area segment corresponding to the information based on the reception by the vehicle-related information reception device; and
distribution device that distributes the area meteorological data selected by the distribution data selection device,
wherein the area meteorological data generation device reads a relating table to generate area meteorological data to be distributed, and
wherein the relating table relates area segments to types of meteorological information and describes constitution percentages of each type of meteorological information.

2. A server that is capable of communicating with a vehicle, the server comprising:
a meteorological information storage device that stores meteorological information;
a vehicle-related information reception device that receives meteorological information of an area segment corresponding to at least one of a present position and route information of the vehicle, the meteorological information specified by the vehicle being a certain type of meteorological information;
a distribution data selection device that selects meteorological information corresponding to the meteorological information received by the vehicle-related information reception device; and
a distribution device that distributes the meteorological information selected by the distribution data selection device.

3. A vehicle-mounted navigation apparatus for searching for a route corresponding to a destination of a vehicle, displaying map data on a display device, and performing a route navigation, the apparatus comprising:
a position determination device that can determine a present position of the vehicle;
a communication device that communicates with a server;
an area segment data storage device that stores area segment data indicating area segments, the area segments being obtained by dividing an area into predetermined units;
a meteorological information specifying device that specifies meteorological information of an area segment corresponding to information of at least one of route information of the route and present position of the vehicle and identified by the position determination device, the meteorological information being a certain type of meteorological information;
a communication control device that sends to the server, via the communication device, the meteorological information specified by the meteorological information specifying device; and
a display control device that displays on the display device a display symbol corresponding to meteorological information included in area meteorological data received by the communication unit from the server.

4. The vehicle-mounted navigation apparatus according to claim 3, wherein the meteorological information specifying device specifies different meteorological information for each area segment in terms of at least one of content and volume associated with the each area segment.

5. A vehicle for searching for a route corresponding to a destination of the vehicle, displaying map data on a display device, arid performing route navigation, the vehicle comprising:
a position determination device that can determine a present position of the vehicle;
a communication device that communicates with a server;
an area segment data storage device that stores area segment data indicating area segments, the area segments being obtained by dividing an area into predetermined units;
a meteorological information specifying device that specifies meteorological information corresponding to at least one of route information of the route and a present position of the vehicle identified by the position determination device, the meteorological information being a certain type of meteorological information; a communication control device that sends to the server via the communication device, the meteorological information specified by the meteorological information specifying device; and
a display control device that displays on the display device a display symbol corresponding to meteorological information included in area meteorological data received by the communication unit from the server.

6. The vehicle according to claim 5, wherein the meteorological information specifying device specifies different meteorological information for each area segment in terms of at least one of content and volume associated with the each area segment.

7. A meteorological information distribution system comprising a server and a vehicle, the server and the vehicle being capable of communicating with each other,
the server comprising:
a meteorological information storage device that stores meteorological information;

an area segment data storage device that stores area segment data indicating area segments, the area segments being obtained by dividing an area into predetermined units;

a distribution area determination device that specifies a range of an area segment for which the meteorological information is to be distributed, based on the meteorological information being a certain type of meteorological information;

an area meteorological data generation device that generates area meteorological data related to the meteorological information corresponding to the range specified by the distribution area determination device;

a vehicle-related information reception device that receives at least one of positional information and route information on the vehicle;

a distribution data selection device that selects the area meteorological data of the area segment corresponding to the information on the vehicle based on the reception by the vehicle-related information reception device; and a distribution device that distributes the area meteorological data selected by the distribution data selection device, and the vehicle comprising:

a position determination device that can determine a present position of the vehicle;

a communication device that communicates with a server;

a route searching device that searches for a route corresponding to a destination of the vehicle;

a communication control device that sends to the server, via the communication device, the information concerning the vehicle; and a display control device that displays on a display device the display symbol corresponding to meteorological information included in the area meteorological data received from the server.

wherein the area meteorological data generation device reads of relating table to generate area meteorological data to be distributed, and wherein the relating table relates area segments to types of meteorological information and describes constitution percentages of each type of meteorological information.

8. A meteorological information distribution system comprising:

a server and a vehicle, the server and the vehicle being capable of communicating with each other, the server comprising:

a meteorological information storage device that stores meteorological information;

a vehicle-related information reception device that receives meteorological information of an area segment corresponding to information of at least one of present position and route information of the vehicle, the meteorological information specified by the vehicle being a certain type of meteorological information;

a distribution data selection device that selects meteorological information received by the vehicle-related information reception device; and a distribution device that distributes the meteorological information selected by the distribution data selection device;

the vehicle comprising:

a position determination device that can determine a present position of the vehicle; a communication device that communicates with a server;

a route searching device that searches for a route corresponding to a destination of the vehicle;

an area segment data storage device that stores area segment data indicating area segments, the area segments being obtained by dividing an area into predetermined units;

a meteorological information specifying device that specifies meteorological information corresponding to at least one of route information on the route and present position of the vehicle identified by the position determination device, the meteorological information being a certain type of meteorological information;

a communication control device that sends to the server, via the communication device, the meteorological information specified by the meteorological information specifying device; and a display control device that displays on the display device on a display device a display symbol corresponding to meteorological information included in area meteorological data received by the communication unit from the server.

* * * * *

UNITED STATES PATENT AND TRADEMARK OFFICE
CERTIFICATE OF CORRECTION

PATENT NO. : 7,535,379 B2
APPLICATION NO. : 11/538284
DATED : May 19, 2009
INVENTOR(S) : Suzuki It is certified that error appears in the above-identified patent and that said Letters Patent is hereby corrected as shown below:

Column 21, Line 43, before "distribution", insert --a--.

Signed and Sealed this

Third Day of November, 2009

David J. Kappos
*Director of the United States Patent and Trademark Office*